United States Patent
Hayashi et al.

(10) Patent No.: US 6,515,041 B2
(45) Date of Patent: Feb. 4, 2003

(54) HIGH ENERGY RADIATION-CURABLE COMPOSITION AND RESIN MOLDING

(75) Inventors: Masayuki Hayashi, Chiba Prefecture (JP); Hideki Kobayashi, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 30 days.

(21) Appl. No.: 09/891,713

(22) Filed: Jun. 26, 2001

(65) Prior Publication Data

US 2002/0016380 A1 Feb. 7, 2002

(30) Foreign Application Priority Data

Jun. 30, 2000  (JP) .................................... 2000-200142

(51) Int. Cl.$^7$ .................................................. C08F 2/46
(52) U.S. Cl. ................ 522/172; 522/148; 522/182; 528/25; 528/26; 528/30; 528/32; 428/446; 428/447; 525/100; 525/101; 264/1.32; 264/1.36; 106/38.2; 106/38.27; 106/38.28; 523/106; 523/107
(58) Field of Search ................ 522/172, 182, 522/148; 528/25, 26, 30, 32; 428/446, 447; 525/100, 101; 264/1.32, 1.36; 106/38.2, 38.27, 38.28; 523/106, 107

(56) References Cited

U.S. PATENT DOCUMENTS

| 4,348,462 A | | 9/1982 | Chung ....................... 428/412 |
|---|---|---|---|
| 4,652,610 A | * | 3/1987 | Dowbenko et al. ........... 528/14 |
| 4,737,562 A | * | 4/1988 | Chaudhury et al. .......... 528/14 |
| 4,921,880 A | * | 5/1990 | Lee et al. ..................... 522/12 |
| 4,980,413 A | * | 12/1990 | Kasuya ...................... 524/265 |
| 5,079,312 A | | 1/1992 | Isozaki et al. .............. 525/479 |
| 5,494,645 A | | 2/1996 | Tayama et al. ............. 427/508 |
| 5,520,952 A | | 5/1996 | Tanitsu et al. ................ 427/58 |
| 5,662,961 A | | 9/1997 | Tanitsu et al. ................ 427/58 |
| 5,840,428 A | | 11/1998 | Blizzard et al. ............ 428/412 |
| 6,281,321 B1 | * | 8/2001 | Kelly et al. ............ 106/287.11 |
| 6,303,678 B1 | * | 10/2001 | Ziche et al. ................ 524/366 |
| 6,323,277 B1 | * | 11/2001 | Petty et al. ................. 524/858 |
| 6,376,634 B1 | * | 4/2002 | Nishikawa et al. ...... 106/287.1 |
| 6,410,150 B1 | * | 6/2002 | Kurosawa et al. .......... 427/387 |
| 6,410,151 B1 | * | 6/2002 | Kurosawa et al. .......... 427/387 |
| 6,413,647 B1 | * | 7/2002 | Hayashi et al. ............. 428/447 |

FOREIGN PATENT DOCUMENTS

| GB | 0 730 015 | 9/1996 | |
|---|---|---|---|
| WO | WO 99/54386 | 10/1999 | ........... C08G/77/04 |

* cited by examiner

Primary Examiner—James J. Seidleck
Assistant Examiner—Sanza L McClendon
(74) Attorney, Agent, or Firm—Patricia M. Scaduto

(57) ABSTRACT

A high energy radiation-curable composition comprising a partial hydrolysis-condensation product of (A) a mixture of an alkoxy containing organopolysiloxane and alkoxysilanes and (B) a multifunctional acrylate, and a resin molding coated with the composition. The composition forms coatings of superior curability, water repellency, water resistance, oil repellency, transparency, flexibility, and scratch resistance, especially on resin moldings.

17 Claims, No Drawings

HIGH ENERGY RADIATION-CURABLE COMPOSITION AND RESIN MOLDING

FIELD OF THE INVENTION

The present invention relates to a high energy radiation-curable composition and a resin molding, and more specifically relates to a high energy radiation-curable composition of superior curability, water repellency, water resistance, oil repellency, transparency, flexibility, and scratch resistance, and to a resin molding having a thin film layer of the composition.

BACKGROUND OF THE INVENTION

In the past, hard coat agents curable by high energy radiation such as ionizing radiation and UV rays have been used in various fields. For example, when coated onto polycarbonate resins and acrylic resins, such hard coat agents have been known to improve wear resistance by preventing scratching of the resin surface. For this reason, they are particularly suitable for use as a substitute for transparent glass used for example for of eyeglasses and automobile headlight covers. Well-known examples of this type of high energy radiation-curable hard coat agents include UV curable hard coat compositions comprising colloidal silica, an acryloxy functional silane, a non-silyl acrylate, and a photopolymerization initiator (see PCT (WO) Sho 57(1982)-500984) and radiation-curable compositions obtained by compounding a cohydrolyzate of a tetralkoxysilane and an unsaturated group-containing alkoxysilane with a multifunctional acrylate (see Japanese Kokai (Unexamined) Patent Application Publication No. Hei 08(1996)-253708).

However, the problem with the former UV curable compositions utilizing colloidal silica was that they tended to gel easily and their storage stability was low. On the other hand, the disadvantage of the latter radiation-curable compositions utilizing a cohydrolyzate of alkoxysilanes was their low water resistance.

It is an object of the present invention to provide a high energy radiation-curable composition and a resin molding of superior curability, water repellency, water resistance, oil repellency, transparency, flexibility, and scratch resistance.

SUMMARY OF THE INVENTION

The present invention relates to a high energy radiation-curable composition comprising (A) 1 to 99 parts by weight of a partial hydrolysis-condensation product of a mixture of
  (a) an alkoxy-containing organopolysiloxane described by formula $(SiO_{4/2})_m(O_{1/2}R)_{4m-2n}$, where R is an alkyl group comprising 1 to 10 carbon atoms, m is an integer of 2 or greater, and n is an integer of $\geq(m-1)$ to $\leq(m-1)\times 2$;
  (b) an alkoxysilane described by formula $R^1{}_a Si(OR^2)_{4-a}$, where $R^1$ is a substituted or unsubstituted monovalent hydrocarbon group comprising 1 to 10 carbon atoms that does not contain aliphatic unsaturated bonds, $R^2$ is an alkyl group comprising 1 to 10 carbon atoms, and a is 1 or 2;
  (c) an alkoxysilane described by formula $R^3{}_b Y Si(OR^4)_{3-b}$, where $R^3$ is a monovalent hydrocarbon group comprising 1 to 10 carbon atoms that does not contain aliphatic unsaturated bonds, $R^4$ is an alkyl group comprising 1 to 10 carbon atoms, Y is a monovalent organic group containing aliphatic unsaturated bonds, and b is 0 or 1; and (B) 99 to 1 part by weight of a multifunctional acrylate. The present invention further relates to a resin molding having a thin film layer of the high energy radiation-curable composition on at least one side.

DESCRIPTION OF THE INVENTION

The present invention relates to a high energy radiation-curable composition comprising (A) 1 to 99 parts by weight of a partial hydrolysis-condensation product of a mixture of
  (a) an alkoxy-containing organopolysiloxane described by formula $(SiO_{4/2})_m(O_{1/2}R)_{4m-2n}$, where R is an alkyl group comprising 1 to 10 carbon atoms, m is an integer of 2 or greater, and n is an integer of $\geq(m-1)$ to $\leq(m-1)\times 2$;
  (b) an alkoxysilane described by formula $R^1{}_a Si(OR^2)_{4-a}$, where $R^1$ is a substituted or unsubstituted monovalent hydrocarbon group comprising 1 to 10 carbon atoms that does not contain aliphatic unsaturated bonds, $R^2$ is an alkyl group comprising 1 to 10 carbon atoms, and a is 1 or 2;
  (c) an alkoxysilane described by formula $R^3{}_b Y Si(OR^4)_{3-b}$, where $R^3$ is a monovalent hydrocarbon group comprising 1 to 10 carbon atoms that does not contain aliphatic unsaturated bonds, $R^4$ is an alkyl group comprising 1 to 10 carbon atoms, Y is a monovalent organic group containing aliphatic unsaturated bonds, and b is 0 or 1; and (B) 99 to 1 part by weight of a multifunctional acrylate. The present invention further relates to a resin molding having a thin film layer of the high energy radiation-curable composition on at least one side.

First of all, explanations are provided regarding the high energy radiation-curable composition of the present invention. Component (A) is obtained by subjecting a mixture of component (a) to component (c) to partial hydrolysis and condensation. Component (A) imparts water repellency, water resistance, oil repellency, adhesive properties, mold release properties, and other superior properties to cured products of the present composition.

The alkoxy-containing organopolysiloxane of component (a) is a component that improves the post-cure hardness by increasing the crosslinking density of the present composition. Component (a) is described by formula $(SiO_{4/2})_m(O_{1/2}R)_{4m-2n}$. In the formula, R is an alkyl group comprising 1 to 10 carbon atoms, exemplified by methyl, ethyl, propyl, butyl, octyl, and decyl, with ethyl being preferable. Subscript m is an integer of not less than 2, preferably in the range of 2 to 20. Subscript n is an integer of not less than (m−1) and not more than (m−1)×2. Specific examples of such alkoxy-containing organopolysiloxanes include hexamethoxydisiloxane, hexaethoxydisiloxane, hexaisopropoxydisiloxane, and other hexalkoxydisiloxanes when subscript m is 2 and subscript n is 1; and polymethoxysiloxane, polyethoxysiloxane, polyisopropoxysiloxane, and other polyalkoxysiloxanes when subscript m is equal to or greater than 3.

The alkoxysilane of component (b) imparts water repellency to the present composition and is described by formula $R^1_a Si(OR^2)_{4-a}$. In the formula, $R^1$ is a substituted or unsubstituted monovalent hydrocarbon group comprising 1 to 10 carbon atoms that does not have aliphatic unsaturated bonds, and is exemplified by methyl, ethyl, propyl, butyl, isobutyl, octyl, decyl, and other alkyl groups; phenyl and other aryl groups; and 3,3,3-trifluoromethyl, perfluorobutylethyl, perfluorooctylethyl, and other fluoroalkyl groups. Among these, methyl, ethyl, propyl, butyl, and isobutyl are preferable, and methyl is especially preferable. $R^2$ is an alkyl group comprising 1 to 10 carbon atoms exemplified by the same groups as the above-described R. Subscript a is 1 or 2, preferably 1. Examples of component (b) include methyltrimethoxysilane, methyltriethoxysilane, methyltriisopropoxysilane, ethyltrimethoxysilane, ethyltriethoxysilane, and ethyltriisopropoxysilane.

The alkoxysilane of component (c) imparts high energy radiation curability to the present composition and is described by formula $R^3_b Y Si(OR^4)_{3-b}$. In the formula, $R^3$ is a monovalent hydrocarbon group comprising 1 to 10 carbon atoms that does not contain aliphatic unsaturated bonds, exemplified by the same groups as the above-described $R^1$. $R^4$ is an alkyl comprising 1 to 10 carbon atoms exemplified by the same groups as the above-described R. Y is a monovalent organic group containing aliphatic unsaturated bonds, specifically exemplified by vinyl, hexenyl, methacryloxy, acryloxy, styryl, vinylether, 3-(methacryloxy) propyl, and 3-(acryloxy)propyl. Subscript b is 0 or 1. Examples of component (c) include vinyltrimethoxysilane, vinyltriethoxysilane, methylvinyldimethoxysilane, 3-(methacryloxy)propyltrimethoxysilane, 3-(methacryloxy) propyltriethoxysilane, 3-(methacryloxy) propylmethyldimethoxysilane, and 3-(acryloxy) propyltrimethoxysilane.

There are no particular limitations concerning the methods used for blending component (a) to component (c), but normally a uniform mixture is obtained by simple stirring. There are no particular limitations concerning the compounding proportions of the components (a) to (c). Preferably, however, per 100 mol of component (a) there should be 1 to 300 mol of component (b) and 1 to 300 mol of component (c), and even more preferably, 1 to 150 mol of component (b) and 1 to 150 mol of component (c).

In addition, the mixture comprising components (a) to (c) may be diluted using organic solvents. Examples of such organic solvents include methanol, ethanol, isopropanol, butanol, isobutanol, ethylene glycol, diethylene glycol, triethylene glycol, ethylene glycol monomethyl ether, diethylene glycol monomethyl ether, triethylene glycol monomethyl ether, and other alcohols; acetone, methyl ethyl ketone, methyl isobutyl ketone, and other ketones; toluene, xylene, and other aromatic hydrocarbons; hexane, octane, heptane, and other aliphatic hydrocarbons; chloroform, methylene chloride, trichloroethylene, carbon tetrachloride, and other organic chlorine based solvents; ethyl acetate, butyl acetate, isobutyl acetate, and other esters. Among these organic solvents, one type of solvent can be used singly or a mixture of two or more solvents can be used.

The partial hydrolysis-condensation product of component (A) can be prepared by adding a less than equivalent amount of water relative to the total amount of alkoxy groups in the above-described component (a) to component (c). In particular, it is preferable to add less than half the equivalent amount of water relative to the total amount of alkoxy groups in component (a) to component (c). It is preferable to use a condensation catalyst during the hydrolysis. Examples of such condensation catalyst include alkyl titanates, tin octylate, dibutyltin dicarboxylates, alkoxyaluminum, aluminum chelates, alkali metal salts of carboxylic acids, alkaline earth metal salts of carboxylic acids, and sulfuric acid, hydrochloric acid, acetic acid, and unsaturated fatty acids. Among these, unsaturated fatty acids are preferable, with acrylic acid and methacrylic acid suggested specifically. In addition, the alcohols produced during the partial hydrolysis can be removed by stripping by means of heating under atmospheric or reduced pressure.

The multifunctional acrylate of component (B) is a component that imparts high energy radiation curability. Examples of component (B) include pentaerythritol tetraacrylate, di-trimethylolpropane tetraacrylate, and other tetraacrylates; trimethylolpropane triacrylate, trimethylolpropane trimethacrylate, pentaerythritol monohydroxytriacrylate, trimethylolpropane triethoxytriacryate, and other triacrylates; 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, bisphenol-A dimethacrylate, and other diacrylates; and dipentaerythritol (monohydroxy)pentaacrylate and other pentaacrylates. In addition, bisphenol-A epoxydiacrylate, hexafunctional aromatic urethane acrylate (trade name: Ebecryl 220), aliphatic urethane diacrylate (trade name: Ebecryl 230), and tetrafunctional polyester acrylate (trade name: Ebecryl 80) are suggested as oligomers of multifunctional acrylates.

The high energy radiation-curable composition of the present invention consists of 1 to 99 parts by weight of the partial hydrolysis-condensation product of component (A) and 99 to 1 part by weight of the multifunctional acrylate of component (B), and it is especially preferable for component (B) to be in the range of from 1 to 100 parts by weight per 10 parts by weight of component (A). This is due to the fact that when there is less than 1 part by weight of component (B), the high energy radiation curability decreases, and when there is more than 99 parts by weight, the hardness and scratch resistance of the thin film layer decrease. In addition, the present composition can be diluted using the aforementioned organic solvents.

The high energy radiation-curable composition of the present invention comprises the above-mentioned component (A) and component (B), but in addition to these components a diorganopolysiloxane or a polyether modified diorganopolysiloxane having silanol or hydrolyzable groups at the terminal ends of the molecular chain can be added and combined therewith in order to improve its coating and curing properties. The amount of the added siloxane is 0.1 to 10 parts by weight, and, preferably, 0.1 to 5 parts by weight, per 100 parts by weight of the mixture of component (a) to component (c). The backbone of the diorganopolysiloxane having silanol or hydrolyzable groups at the terminal ends of the molecular chain is preferably made up of polydimethylsiloxane, or it may be a siloxane obtained by substituting, for example, phenyl, 3,3,3-trifluoromethyl, perfluorobutylethyl, and perfluorooctylethyl for some of its methyl groups. As for the terminal ends of the molecular chain, either both ends may be blocked by a silanol group or a hydrolyzable group, or one terminal end may be blocked by a silanol group or a hydrolyzable group while the other terminal end may be blocked by a triorganosiloxy group. In addition, the hydrolyzable groups are exemplified by methoxy, ethoxy, and other alkoxy groups. The viscosity at 25° C. of such a diorganopolysiloxane having silanol or hydrolyzable groups at the terminal ends of the molecular chain is preferably in the range of from 10 to 1,000,000 mPa·s, and, even more preferably, in the range of from 100 to 100,000 mPa·s. In addition, the polyether modified diorganopolysiloxane is a linear siloxane which, at the terminal ends of the molecular chain or on side chains, has polyoxyethylene groups or polyoxyalkylene groups produced as a result of oxyethylene and oxypropylene forming block bonds or random bonds. Groups bonded to silicon atoms other than the polyoxyalkylene groups are preferably methyl groups, and the above-described phenyl and fluoroalkyl groups may be substituted for some of the methyl groups. The viscosity at 25° C. of such a polyether modified diorganopolysiloxane is preferably in the range of from 100 to 100,000 mPa·s.

If necessary, thickeners, UV absorbers, and other additives; various pigments, dyes, and other colorants; aluminum paste, talc, glass frit, colloidal silica dispersed in organic solvents, metal powders, and, in addition, butylated hydroxytoluene (BHT), phenothiazine (PTZ), and other acrylate self-polymerization inhibitors can be added and combined with the aforementioned curable composition. Additionally, when the present composition is cured with UV radiation, it is preferable to combine it with a photopolymerization initiator, such as, for example, 2-methyl-{4-(methylthio)phenyl}-2-morpholino-1-propane (available from Ciba Geigy AG Japan; trade name IRGACURE 907), and 1-hydroxycyclohexylphenylketone (available from Ciba Geigy AG Japan; trade name IRGACURE 184). Also, benzophenone, acetophenone, benzoin, and various benzoin derivatives and known photopolymerization initiators can be also used.

Next, explanations are provided regarding the resin molding of the present invention. The resin molding of the present invention is a molding having a thin film layer of the present composition on at least on one side thereof. There are no particular limitations concerning the resin used for the substrate, and for example may be polyethylene, polypropylene, and other polyolefin resins; polyethylene terephthalate, polyethylene isophthalate, polyethylene-2,6-naphthalate, polybutylene terephthalate, or their copolymers, and other polyester resins; polyamide resins; polystyrene, poly(meth)acrylic acid ester, polyacrylonitrile, polyvinyl acetate, polycarbonate, cellophane, polyimide, polyether imide, polyphenylene sulfone, polysulfone, polyether ketone, ionomer resin, fluororesin, and other thermoplastic resins; melamine resin, polyurethane resin, epoxy resin, phenolic resin, unsaturated polyester resin, alkyd resin, urea resin, silicone resin, and other thermosetting resins. In addition, there are no particular limitations concerning the shape of the resin molding, which may be, for example, film-shaped, sheet-shaped, and bottle-shaped. Although there are no particular limitations concerning its thickness, the layer is usually 5 to 100 $\mu$m in case of a film or a sheet. Although the shape of the resin molding of the present invention is selected in accordance with the intended use, a thermoplastic film is preferable from the standpoint of the ease of processing.

There are no particular limitations concerning the process used for coating the present composition on the resin molding. A thin film layer of the present composition can be formed on the surface of the molding by well-known methods, such as, for example, flow coating, immersion coating, spin coating, spray coating, curtain coating, gravure coating, Mayer bar coating, and dip coating. In addition, prior to coating, the surface of the molding can be subjected to surface activation treatment such as corona treatment and to well-known fixing treatment using urethane resins, etc. Generally speaking, when the molding is intended for applications requiring scratch resistance, the amount of the present composition used for coating is preferably such that the thickness of the thin film layer is 0.5 to 25 $\mu$m, and even more preferably such that the thickness is 1 to 20 $\mu$m. After coating, drying and curing of the thin film is carried out. The present composition dries at room temperature, but in order to dry it faster it can be dried at temperatures lower than the heat resistance temperature of the resin molding. After drying, a cured thin film layer can be formed within an extremely short time by means of irradiation with high energy radiation. UV radiation, ionizing radiation, and electron beams are suggested as the high energy radiation. When UV radiation is used, the film can be cured within an extremely short time. The amount of UV radiation is generally at least 2 mJ/cm$^2$, and, preferably, between 10 and 2000 mJ/cm$^2$. In addition when electron beams and ionizing radiation are used as the high energy radiation, a thin film layer of the present composition is obtained without adding the above-mentioned photopolymerization initiator. The resin molding of the present invention may be a resin molding having a laminated structure, in which a pressure-sensitive adhesive or such is coated on the side opposite the side on which the thin film layer of the present composition is formed.

After curing, the high energy radiation-curable composition of the present invention as described above is characterized by superior water repellency, water resistance, oil repellency, transparency, flexibility, and scratch resistance. For this reason, the resin molding of the present invention that has a thin film layer of the present composition can be used for various applications requiring such characteristics and is particularly suitable for protective films used for automobile and construction window glass, protective films used for displays, touch panels, and the like, and for transparent resin glass of automobile head lamps.

APPLICATION EXAMPLES

Hereinbelow, the present invention is explained specifically by referring to application examples. In the application examples, the term "parts" refers to parts by weight and "viscosity" refers to a value measured at 25° C.

Application Example 1. 3 g Of methyltrimethoxysilane, 9 g of 3-methacryloxypropyltrimethoxysilane, and 1 g of acrylic acid were placed in a flask and a partial hydrolysis-condensation product was obtained by adding, under agitation, 0.94 g water and then adding 10 g of polymethoxysiloxane (viscosity: 10 mPa·s, specific weight: 1.2) represented by the molecular formula $(SiO_{4/2})_4(O_{1/2}CH_3)_{10}$. Next, 50 g toluene and 35 g pentaerythritol tetraacrylate were placed in the flask and the components were subjected to mixing for 3 hours. Then, a high energy radiation-curable composition A was prepared by adding 40 ppm phenothiazine and 2.5 g of photopolymerization initiator (available from Ciba Geigy AG Japan; trade name IRGACURE 184).

The thus obtained high energy radiation-curable composition A was coated on a PET film with a thickness of 188 μm (available from Toray Inc.; trade name S-10) using a bar coater and subjected to drying for 3 hours at 120° C. Then, a PET film having a thin film layer (thickness: 2 μm) of high energy radiation-cured composition A was obtained by curing it by means of irradiation with UV radiation at 1200 mJ/cm$^2$. The light transmittance of the resultant film, measured using a UV-visible spectrophotometer (UV-visible Recording Spectrophotometer from Shimadzu Corp., UV-265FW) at 50 nm was 60%. It was found that the thin film layer of the composition had resulted in improved transparency because the light transmittance of the PET film prior to coating with high energy radiation-curable composition A was 57%. Also, the water contact angle of the thin film layer measured using a contact angle meter (available from Kyowa Interface Science Co., Ltd.; CA-Z) was 96°, and the pencil hardness of the surface was 3H. Furthermore, when the surface of the thin film layer was rubbed with steel wool, there were practically no scratches and its transparency did not decrease.

In addition, after forming a thin film layer in the same manner as described above by coating the thus obtained high energy radiation-curable composition A on a PET film with a thickness of 25 μm, the PET film was cut into A4-size pieces. The film was found to be of excellent water resistance because when the thin film layer surface of the film was sprayed with a 1% aqueous solution of a neutral detergent and left stand for 5 minutes, the film exhibited practically no curling. Furthermore, when lines were drawn on the surface of the thin film layer using an oil-based ink, crawling was observed, and the lines could be easily wiped off with a cloth. Based on this, it was determined that the film had excellent oil repellency. In addition, the thin film layer was found to have excellent adhesive properties with respect to the substrate because the thin film layer did not peel off and remained firmly adhered to the PET film when a cellophane tape was adhered to and then peeled off the surface of the thin film layer after allowing the film to stand at room temperature for 1 month.

Application Example 2. 5 g of methyltrimethoxysilane, 15 g of 3-methacryloxypropyltrimethoxysilane, and 1 g of acrylic acid were placed in a flask and partial hydrolysis was conducted by adding, under agitation, 1.57 g of water and 1.43 g of polymethoxysiloxane (viscosity: 10 mPa·s, specific weight: 1.2) represented by the molecular formula $(SiO_{4/2})_4(O_{1/2}CH_3)_{10}$, whereupon methanol was removed by heating to 50° C. under reduced pressure. 35 g Of pentaerythritol tetraacrylate were added and mixed with 12.5 g of the thus obtained partial hydrolysis-condensation product, whereupon a high energy radiation-curable composition B was prepared by adding 40 ppm phenothiazine and 2.5 g of photopolymerization initiator (available from Ciba Geigy AG Japan; trade name IRGACURE 184).

The thus obtained high energy radiation-curable composition B was coated on a PET film with a thickness of 188 μm (available from Toray Inc.; trade name S-10) using a bar coater and subjected to drying for 3 hours at 120° C. Then, a PET film having a thin film layer (thickness: 2 μm) of high energy radiation-curable composition B was obtained by curing it by means of irradiation with UV radiation at 1200 mJ/cm$^2$. The water contact angle of the thin film layer, measured in the same manner as in Application Example 1, was 97°, and the pencil hardness of the surface was 3H. Furthermore, when the surface of the thin film layer was rubbed with steel wool, there were practically no scratches and its transparency did not decrease.

In addition, after forming a thin film layer in the same manner as described above by coating the thus obtained high energy radiation-curable composition B on a PET film with a thickness of 25 μm, the PET film was cut into A4-size pieces. The film was found to be of excellent water resistance because when the thin film layer surface of the film was sprayed with a 1% aqueous solution of a neutral detergent and left stand for 5 minutes, the film exhibited practically no curling. In addition, the thin film layer was found to have excellent adhesive properties with respect to the substrate because the thin film layer did not peel off and remained firmly adhered to the PET film when a cellophane tape was adhered to and then peeled off the surface of the thin film layer after allowing the film to stand at room temperature for 1 month.

Application Example 3. 3 g Of methyltrimethoxysilane, 9 g of 3-methacryloxypropyltrimethoxysilane, and 1 g of acrylic acid were placed in a flask and partial hydrolysis was carried out by adding, under agitation, 0.94 g water and then adding 10 g of polymethoxysiloxane (viscosity: 10 mPa s, specific weight: 1.2) represented by the molecular formula $(SiO_{4/2})_4(O_{1/2}CH_3)_{10}$, followed by removal of methanol by heating to 50° C. under reduced pressure. Then, 50 g toluene and 35 g pentaerythritol tetraacrylate were added and mixed therewith. Next, a high energy radiation-curable composition C was prepared by adding 0.1 g of polydimethylsiloxane having polyoxyethylene side chains (polyoxyethylene chain content: 47 wt %) with a viscosity of 270 mm$^2$/s and a specific weight of 1.03, 40 ppm phenothiazine, and 2.5 g photopolymerization initiator (available from Ciba Geigy AG Japan; trade name IRGACURE 184).

The thus obtained high energy radiation-curable composition C was coated on a PET film with a thickness of 188 μm (available from Toray Inc.; trade name S-10) using a bar coater and subjected to drying for 3 hours at 120° C. Then, a PET film having a thin film layer (thickness: 2 μm) of high energy radiation-curable composition C was obtained by curing it by means of irradiation with UV radiation at 1200 mJ/cm$^2$. The light transmittance of the resultant film, measured using a UV-visible spectrophotometer (UV-visible Recording Spectrophotometer from Shimadzu Corp.; UV-265FW) at 50 nm was 60%. It was found that the thin film layer of the composition had resulted in improved transparency because the light transmittance of the PET film prior to coating with high energy radiation-curable composition C had been 57%. Also, the water contact angle of the thin film layer, measured in the same manner as in Application Example 1, was 98°, and the pencil hardness of the surface was 3H. Furthermore, when the surface of the thin film layer was rubbed with steel wool there were practically no scratches and its transparency did not decrease.

In addition, after forming a thin film layer in the same manner as described above by coating the thus obtained high energy radiation-curable composition C on a PET film with a thickness of 25 μm, the PET film was cut into A4-size pieces. The film was found to be of excellent water resistance because when the thin film layer surface of the film was sprayed with a 1% aqueous solution of a neutral detergent and left stand for 5 minutes, the film exhibited practically no curling. Furthermore, when lines were drawn on the surface of the thin film layer using an oil-based ink, crawling was observed and the lines could be easily wiped off with a cloth. Based on this, it was determined that the film had excellent oil repellency. In addition, the thin film layer was found to have excellent adhesive properties with respect to the substrate because the thin film layer did not peel off and remained firmly adhered to the PET film when a cellophane tape was adhered to and then peeled off the surface of the thin film layer after allowing the film to stand at room temperature for 1 month.

Application Example 4. 3 g Of methyltrimethoxysilane, 9 g of 3-methacryloxypropyltrimethoxysilane, and 1 g of acrylic acid were placed in a flask and partial hydrolysis was carried out by adding, under agitation, 0.94 g water and then adding 10 g of polymethoxysiloxane (viscosity: 10 mPa s, specific weight: 1.2) represented by the molecular formula $(SiO_{4/2})_4(O_{1/2}CH_3)_{10}$, followed by removal of methanol by heating to 50° C. under reduced pressure. Then, 50 g toluene and 35 g pentaerythritol tetraacrylate were added and mixed therewith. Next, a high energy radiation-curable composition D was prepared by adding 0.1 g of polydimethylsiloxane with a viscosity of 13,000 mPa s and a specific weight of 0.98 having both terminal ends blocked by silanol groups, 40 ppm phenothiazine, and 2.5 g photopolymerization initiator (available from Ciba Geigy AG Japan; trade name IRGACURE 184).

The thus obtained high energy radiation-curable composition D was coated on a PET film with a thickness of 188 μm (available from Toray Inc.; trade name S-10) using a bar coater and subjected to drying for 3 hours at 120° C. Then, a PET film having a thin film layer (thickness: 2 μm) of high energy radiation-curable composition D was obtained by curing it by means of irradiation with UV radiation at 1200 mJ/cm². The water contact angle of the thin film layer, measured in the same manner as in Application Example 1, was 99°, and the pencil hardness of the surface was 3H. Furthermore, when the surface of the thin film layer was rubbed with steel wool there were practically no scratches and its transparency did not decrease.

In addition, after forming a thin film layer in the same manner as described above by coating the thus obtained high energy radiation-curable composition D on a PET film with a thickness of 25 μm, the PET film was cut into A4-size pieces. The film was found to be of excellent water resistance because when the thin film layer surface was sprayed with a 1% aqueous solution of a neutral detergent and left stand for 5 minutes, the film exhibited practically no curling. In addition, the thin film layer was found to have excellent adhesive properties with respect to the substrate because the thin film layer did not peel off and remained firmly adhered to the PET film when a cellophane tape was adhered to and then peeled off the surface of the thin film layer after allowing the film to stand at room temperature for 1 month.

Comparative Example 1. A high energy radiation-curable composition was obtained in the same manner as in Application Example 1, with the exception that unlike Application Example 1, methyltrimethoxysilane was not added. The resultant high energy radiation-curable composition was coated on a PET film in the same manner as in Application Example 1. The water contact angle of the thin film layer of the resultant PET film, measured in the same manner as in Application Example 1, was 94°. When lines were drawn on the thin film layer of the PET film using an oil-based ink, no crawling was observed and the lines could not be easily wiped off with a cloth. Based on this, it was determined that the film had low oil repellency.

Application Example 5. 2 g Of dimethyldimethoxysilane, 9 g of 3-methacryloxypropyltrimethoxysilane, and 1 g of acrylic acid were placed in a flask and a partial hydrolysis-condensation product was obtained by adding, under agitation, 0.94 g water and then adding 10 g of polymethoxysiloxane (viscosity: 10 mPa s, specific weight: 1.2) represented by the molecular formula $(SiO_{4/2})_4(O_{1/2}CH_3)_{10}$.

Next, 50 g toluene and 35 g pentaerythritol tetraacrylate were placed in the flask and the components were subjected to mixing for 3 hours. Then, a high energy radiation-curable composition was prepared by adding 40 ppm phenothiazine and 2.5 g of photopolymerization initiator (available from Ciba Geigy AG Japan; trade name IRGACURE 184).

The thus obtained high energy radiation-curable composition E was coated on a PET film with a thickness of 188 μm (available from Toray Inc.; trade name S-10) using a bar coater and subjected to drying for 3 hours at 120° C. Then, a PET film having a thin film layer (thickness: 2 μm) of high energy radiation-curable composition E was obtained by curing it by means of irradiation with UV radiation at 1200 mJ/cm². The water contact angle of the thin film layer, measured using a contact angle meter (available from Kyowa Interface Science Co., Ltd.; CA-Z), was 96°, and the pencil hardness of the surface was 3H.

What is claimed is:

1. A high energy radiation-curable composition comprising
   (A) 1 to 99 parts by weight of a partial hydrolysis-condensation product of a mixture of
      (a) an alkoxy-containing organopolysiloxane described by formula $(SiO_{4/2})_m(O_{1/2}R)_{4m-2n}$, where R is an alkyl group comprising 1 to 10 carbon atoms, m is an integer of 2 or greater, and n is an integer of $\geq(m-1)$ to $\leq(m-1)\times 2$;
      (b) an alkoxysilane described by formula $R^1_a Si(OR^2)_{4-a}$, where $R^1$ is a substituted or unsubstituted monovalent hydrocarbon group comprising 1 to 10 carbon atoms that does not contain aliphatic unsaturated bonds, $R^2$ is an alkyl group comprising 1 to 10 carbon atoms, and a is 1 or 2;
      (c) an alkoxysilane described by formula $R^3_b YSi(OR^4)_{3-b}$, where $R^3$ is a monovalent hydrocarbon group comprising 1 to 10 carbon atoms that does not contain aliphatic unsaturated bonds, $R^4$ is an alkyl group comprising 1 to 10 carbon atoms, Y is a monovalent organic group containing aliphatic unsaturated bonds, and b is 0 or 1; and
   (B) 99 to 1 part by weight of a multifunctional acrylate.

2. The high energy radiation-curable composition according to claim 1 where the partial hydrolysis-condensation product of the mixture of component (a) to component (c) is partially hydrolyzed in the presence of an unsaturated fatty acid.

3. The high energy radiation-curable composition according to claim 1 further comprising 0.1 to 10 parts by weight of a diorganopolysiloxane or polyether modified diorganopolysiloxane having silanol or hydrolyzable groups at the terminal ends of the molecular chain, per 100 parts by weight of component (A).

4. The high energy radiation-curable composition according to claim 1 further comprising a photopolymerization initiator.

5. A resin molding comprising a thin film layer of a high energy radiation-curable composition comprising
   (A) 1 to 99 parts by weight of a partial hydrolysis-condensation product of a mixture of (a) an alkoxy-containing organopolysiloxane described by formula $(SiO_{4/2})_m(O_{1/2}R)_{4m-2n}$, where R is an alkyl group comprising 1 to 10 carbon atoms, m is an integer of 2 or greater, and n is an integer of $\geq(m-1)$ to $\leq(m-1)\times 2$;

(b) an alkoxysilane described by formula $R^1_a Si(OR^2)_{4-a}$, where $R^1$ is a substituted or unsubstituted monovalent hydrocarbon group comprising 1 to 10 carbon atoms that does not contain aliphatic unsaturated bonds, $R^2$ is an alkyl group comprising 1 to 10 carbon atoms, and a is 1 or 2;

(c) an alkoxysilane described by formula $R^3_b YSi(OR^4)_{3-b}$, where $R^3$ is a monovalent hydrocarbon group comprising 1 to 10 carbon atoms that does not contain aliphatic unsaturated bonds, $R^4$ is an alkyl group comprising 1 to 10 carbon atoms, Y is a monovalent organic group containing aliphatic unsaturated bonds, and b is 0 or 1; and (B) 99 to 1 part by weight of a multifunctional acrylate.

6. The resin molding according to claim 5 where the resin molding is a film.

7. The resin molding according to claim 5 where the partial hydrolysis-condensation product of the mixture of component (a) to component (c) is partially hydrolyzed in the presence of an unsaturated fatty acid.

8. The resin molding according to claim 5 where the high energy radiation-curable composition further comprises 0.1 to 10 parts by weight of a diorganopolysiloxane or polyether modified diorganopolysiloxane having silanol or hydrolyzable groups at the terminal ends of the molecular chain, per 100 parts by weight of component (A).

9. The resin molding according to claim 5 where the high energy radiation-curable composition further comprises a photopolymerization initiator.

10. The high energy radiation-curable composition according to claim 1 comprising 1 to 300 mol of component (b) and 1 to 300 mol of component (c) per 100 mol of component (a).

11. The high energy radiation-curable composition according to claim 1 comprising 1 to 150 mol of component (b) and 1 to 150 mol of component (c) per 100 mol of component (a).

12. The high energy radiation-curable composition according to claim 1 comprising from 1 to 100 parts by weight of component (B) per 10 parts by weight of component (A).

13. The high energy radiation-curable composition according to claim 2 where the unsaturated fatty acid is selected from the group consisting of acrylic acid and methacrylic acid.

14. The resin molding according to claim 5 where the high energy radiation-curable composition comprises 1 to 300 mol of component (b) and 1 to 300 mol of component (c) per 100 mol of component (a).

15. The resin molding according to claim 5 where the high energy radiation-curable composition according to claim 1 comprises 1 to 150 mol of component (b) and 1 to 150 mol of component (c) per 100 mol of component (a).

16. The resin molding according to claim 5 where the high energy radiation-curable composition according to claim 1 comprises from 1 to 100 parts by weight of component (B) per 10 parts by weight of component (A).

17. The resin molding according to claim 7 where the unsaturated fatty acid is selected from the group consisting of acrylic acid and methacrylic acid.

* * * * *